US012663317B2

(12) United States Patent
Kwon et al.

(10) Patent No.: US 12,663,317 B2
(45) Date of Patent: Jun. 23, 2026

(54) APPARATUS AND METHOD FOR ESTIMATING BODY TEMPERATURE

(71) Applicant: SAMSUNG ELECTRONICS CO., LTD., Suwon-si (KR)

(72) Inventors: Bok Soon Kwon, Seoul (KR); Sang Kyu Kim, Yongin-si (KR); So Young Lee, Suwon-si (KR); Sung Ho Kim, Suwon-si (KR); Ho Taik Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 522 days.

(21) Appl. No.: 17/900,404

(22) Filed: Aug. 31, 2022

(65) Prior Publication Data

US 2023/0358617 A1 Nov. 9, 2023

(30) Foreign Application Priority Data

May 3, 2022 (KR) ........................ 10-2022-0054615

(51) Int. Cl.
*G01K 3/06* (2006.01)
*G01K 13/20* (2021.01)
(52) U.S. Cl.
CPC .............. *G01K 3/06* (2013.01); *G01K 13/20* (2021.01)
(58) Field of Classification Search
CPC .......... G01K 3/06; G01K 13/20; G01K 7/427; A61B 2560/0252; A61B 5/681; A61B 5/01; A61B 5/6801; A61B 5/7445; A61B 2562/0271; A61B 2562/063; A61B 2562/16

USPC ................................................... 374/115, 374
See application file for complete search history.

(56) References Cited

U.S. PATENT DOCUMENTS

| | | | |
|---|---|---|---|
| 7,249,883 B2 | 7/2007 | Kuroda et al. | |
| 7,299,090 B2 | 11/2007 | Koch | |
| 8,292,502 B2 | 10/2012 | Bieberich et al. | |
| 9,015,001 B2 | 4/2015 | Shimizu | |

(Continued)

FOREIGN PATENT DOCUMENTS

| | | |
|---|---|---|
| EP | 2459976 B1 | 11/2018 |
| JP | 5898204 B2 | 4/2016 |

(Continued)

OTHER PUBLICATIONS

U.S. Appl. No. 17/409,242, filed Aug. 23, 2021.

(Continued)

*Primary Examiner* — Kristina M Deherrera
*Assistant Examiner* — Evan Mancini
(74) *Attorney, Agent, or Firm* — Sughrue Mion, PLLC

(57) ABSTRACT

An apparatus for estimating body temperature of an object may include: a heating element; a first temperature sensor configured to measure temperature of the heating element; a second temperature sensor disposed at a position spaced apart from the first temperature sensor and configured to measure surface temperature of an object upon contact with the object; and a processor configured to estimate core temperature using a heat flux based on the temperature of the heating element and the surface temperature of the object, and to estimate body temperature of the object by correcting the core temperature, estimated using the heat flux, based on external temperature.

15 Claims, 18 Drawing Sheets

(56)                    References Cited

U.S. PATENT DOCUMENTS

| | | | | |
|---|---|---|---|---|
| 9,341,519 B2 * | 5/2016 | Goto | .................... | G01K 1/20 |
| 9,357,929 B2 | 6/2016 | Paquet | | |
| 9,504,389 B2 | 11/2016 | Augustine | | |
| 10,368,811 B1 | 8/2019 | Bajaj et al. | | |
| 10,765,409 B2 * | 9/2020 | Lafon | ................ | A61B 5/14546 |
| 11,045,091 B2 | 6/2021 | Tsuchimoto | | |
| 11,109,764 B2 * | 9/2021 | Bongers | ............... | A61B 5/0002 |
| 11,224,344 B2 * | 1/2022 | Ellis | .................. | A61B 5/02055 |
| 11,686,626 B2 * | 6/2023 | Roghanizad | .......... | G01N 25/18 |
| | | | | 374/100 |
| 2008/0170600 A1 * | 7/2008 | Sattler | ..................... | G01K 1/16 |
| | | | | 374/E7.018 |
| 2012/0109572 A1 * | 5/2012 | Shimizu | ................ | G01K 13/20 |
| | | | | 702/131 |
| 2012/0238901 A1 * | 9/2012 | Augustine | ............... | A61B 5/01 |
| | | | | 600/549 |
| 2013/0341315 A1 * | 12/2013 | Blank | .................... | G01K 13/20 |
| | | | | 219/494 |
| 2017/0049333 A1 | 2/2017 | Heller | | |
| 2017/0311812 A1 | 11/2017 | Husheer | | |
| 2019/0350462 A1 | 11/2019 | Biederman et al. | | |
| 2019/0388031 A1 * | 12/2019 | Haber | ................... | G01K 1/165 |
| 2021/0123819 A1 | 4/2021 | Seyama et al. | | |

FOREIGN PATENT DOCUMENTS

| | | |
|---|---|---|
| WO | 2011/012386 A1 | 2/2011 |
| WO | 2021/057873 A1 | 4/2021 |

OTHER PUBLICATIONS

U.S. Appl. No. 17/522,363, filed Nov. 9, 2021.
Search Report dated Oct. 10, 2023 issued by European Patent Office in counterpart European Application No. 22212803.5.

* cited by examiner

APPARATUS AND METHOD FOR ESTIMATING BODY TEMPERATURE

CROSS-REFERENCE TO RELATED APPLICATION(S)

This application claims priority from Korean Patent Application No. 10-2022-0054615, filed on May 3, 2022, in the Korean Intellectual Property Office, the disclosure of which is incorporated herein by reference in its entirety.

BACKGROUND

1. Field

Apparatuses and methods consistent with example embodiments relate to estimating body temperature by using a plurality of sensors.

2. Description of the Related Art

Generally, body temperature is one of four vital signs and has very important clinical significance. A body temperature sensor may be used in various applications, such as checking infections in patients, thermal side effects of medications, time of ovulation in women, and the like. Core body temperature measured by the body temperature sensor is the temperature of the internal organs located deep within the body, such that when the core body temperature is measured using an invasive method which is preferred, inconvenience and danger may be caused by the invasive method. Accordingly, in order to provide health management not only in hospitals but also in daily life, it is required to monitor the core body temperature by using a non-invasive method. Generally, it is difficult to measure the core body temperature by using the non-invasive method, since the core body temperature measured by an electronic device in a non-invasive manner may vary depending on external temperature. Accordingly, there is a need for a method of measuring body temperature at a high accuracy in consideration of the external temperature.

SUMMARY

According to an aspect of an example embodiment, an apparatus for estimating body temperature may include: a heating element; a first temperature sensor configured to measure a temperature of the heating element; a second temperature sensor configured to measure a surface temperature of an object when the second temperature sensor is in contact with the object; and a processor configured to estimate a core temperature of the object based on a heat flux caused by a difference between the temperature of the heating element and the surface temperature of the object, and estimate a body temperature of the object by correcting the core temperature that is estimated using the heat flux, based on an external temperature.

In response to a user's request for estimating the body temperature, the processor may be further configured to change the temperature of the heating element by turning on the heating element.

The processor may be further configured to estimate the core temperature in a state in which the surface temperature of the object becomes equal to the temperature of the heating element.

The processor may be further configured to estimate the body temperature of the object by applying a predetermined correction coefficient to the external temperature to obtain a corrected external temperature, and by combining the corrected external temperature with the core temperature resulting from the heat flux.

The apparatus may further include a third temperature sensor configured to measure the external temperature.

The apparatus may further include a communication interface configured to receive the external temperature from an external temperature measuring device.

The apparatus may further include a display configured to display a user interface to receive the external temperature from a user.

The first temperature sensor, the second temperature sensor, and the heating element may be arranged in a single line.

The heating element may include at least one of a heater, a battery included in the apparatus, and a light emitting diode (LED).

The first temperature sensor may be disposed between the heating element and the second temperature sensor.

The apparatus may be a smart watch, and may further include a main body, and a strap connected to the main body. The second temperature sensor may be disposed on a rear surface of the main body to be contacted by a wrist when the second temperature sensor is turned on to measure a skin temperature of the wrist as the surface temperature of the object.

The first temperature sensor and the second temperature sensor may be disposed in a thickness direction of the main body.

According to an aspect of another example embodiment, a method of estimating body temperature may include measuring a temperature of a heating element by using a first temperature sensor; measuring a surface temperature of an object by using a second temperature sensor when the second temperature sensor is in contact with the object; estimating a core temperature of the object based on a heat flux caused by a difference between the temperature of the heating element and the surface temperature of the object; and estimating a body temperature of the object by correcting the core temperature that is estimated using the heat flux, based on an external temperature.

The method may further include, in response to a user's request for estimating the body temperature, changing the temperature of the heating element by turning on the heating element.

The estimating of the core temperature using the heat flux may include estimating the core temperature in a state in which the surface temperature of the object becomes equal to the temperature of the heating element.

The estimating of the body temperature of the object may include estimating the body temperature of the object by applying a predetermined correction coefficient to the external temperature to obtain a corrected external temperature, and combining the corrected external temperature with the core temperature resulting from the heat flux.

A non-transitory computer readable storage medium storing instructions, when executed by at least one processor, to perform the method for estimating the body temperature.

BRIEF DESCRIPTION OF THE DRAWINGS

The above and/or other aspects will be more apparent by describing certain example embodiments, with reference to the accompanying drawings, in which:

FIG. 6 is a block diagram illustrating an apparatus for estimating body temperature according to another example embodiment of the present disclosure;

DETAILED DESCRIPTION

Figure 1:
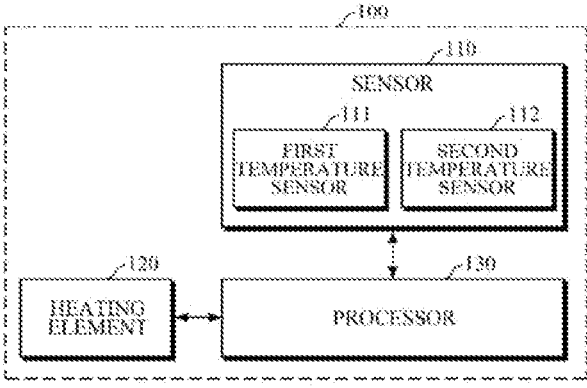
FIG. 1 is a block diagram illustrating an apparatus for estimating body temperature according to an example embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof.

Figure 2:
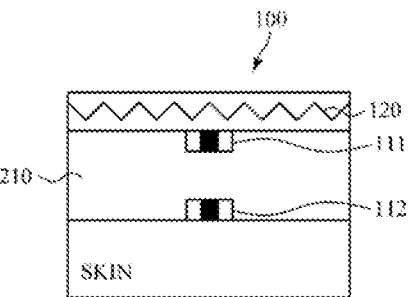
FIG. 2 is a diagram illustrating an example of a structure of an apparatus for estimating body temperature.

FIG. 1 is a block diagram illustrating an apparatus for estimating body temperature according to an example embodiment of the present disclosure. FIG. 2 is a diagram illustrating an example of a structure of an apparatus for estimating body temperature.

Referring to FIG. 1, an apparatus 100 for estimating body temperature includes a sensor 110, a heating element 120, and a processor 130.

The sensor 110 may include a plurality of temperature sensors that obtain temperature data for estimating body temperature from an object.

The heating element 120 may have a structure for radiating heat in the apparatus 100 for estimating body temperature, and a heater, an electric heating pad, or a resistor may be used as an example of the heating element 120. In addition, a heating structure (battery) included in the apparatus 100 for estimating body temperature may be used instead of the heater, and a light emitting diode (LED) capable of converting light to heat may also be used separately. However, the type of the heating element 120 is not limited thereto. In addition, the heating element 120 may be disposed at various positions in the apparatus 100 for estimating body temperature. For example, the heating element 120 may be disposed on a printed circuit board (PCB) in the apparatus 100 for estimating body temperature or may be spaced apart from a structure (e.g., CPU), the performance of which is affected by heat. Further, in order to accurately measure a heat flux generated by the heating element 120, the heating element 120 may be disposed between structures which may be insulated. In this case, the arrangement of the heating element 120 is not limited thereto.

The processor 130 may be electrically connected to the sensor 110 and the heating element 120, and may control the sensor 110 and the heating element 120 to obtain a plurality of temperature data, and may estimate body temperature of an object by using the obtained data.

Referring to FIG. 2, the sensor 110 may include a first temperature sensor 111 and a second temperature sensor 112. For example, the first temperature sensor 111 may measure temperature of the heating element 120. The second temperature sensor 112 may be disposed at a position spaced apart from the first temperature sensor 111, and may measure surface temperature of an object upon contact with the object. In this case, the heating element 120 may be disposed at an upper end of the first temperature sensor 111. In addition, the first temperature sensor 111 and the heating element 120 may be disposed on the same plane. For example, the heating element 120 and the first temperature sensor 111 may be disposed in parallel with each other, and the heating element 12 may surround the first temperature sensor 111.

In an example embodiment, the processor 130 may send to the heating element 120, a control signal including a requested temperature to turn on the heating element 120 and to increase the temperature of the heating element 120 to the requested temperature. Under the assumption that the heating element 120 is heated up to the temperature as requested by the control signal, the apparatus 100 may omit the first temperature sensor 111. For example, when the processor 130 transmits to the heating element 120, a control signal for setting the temperature of the heating element 120 to 36° C., the heating element 120 may supply current to a conductive wire inside the heating element 120 to increase the temperature of the heating element 120 to 36° C., and after a preset time (e.g., 3 minutes) elapses, the processor 130 may determine that the temperature of the heating element 120 has reached 36° C. without using the first temperature sensor 111. However, in order to confirm that the temperature of the heating element 120 has reached the requested temperature, the processor 130 may use the first temperature sensor 111 to measure the temperature of the heating element 120. Additionally, the processor 130 may receive the surface temperature of the object that is measured by the second temperature sensor 112, and then may set the requested temperature to be the same as the surface temperature of the object to generate a thermal equilibrium state between the heating element 120 and the second temperature sensor 112.

Each of the first temperature sensor 111 and the second temperature sensor 112 may include a thermistor. The thermistor may be implemented as a contact type temperature sensor that is configured to come into contact with an object (e.g., a wrist) to measure surface temperature of the object, or may be disposed on a surface of the heating element 120 to measure temperature of the heating element 120.

Further, the first temperature sensor 111 and the second temperature sensor 112 may have a stacked structure with a thermally conductive material 210 disposed therebetween. The first temperature sensor 111 and the second temperature sensor 112 may be embedded in the thermally conductive material 210, and may be aligned to directly face each other in a vertical direction (e.g., a thickness direction of the apparatus 100). For example, the thermally conductive material 210 may be, for example, an insulator having a size of 0.1 mm to 5 mm and may be a material (e.g., polyurethane foam) having a thermal conductivity of 0.1 W/mK or less. The size and thermal conductivity of the insulator are not limited thereto. Further, an air-filled structure may also be provided in which air having a very low thermal conductivity (e.g., a conductivity in a range from 0.025-0.30 W/mK) is filled between the first temperature sensor 111 and the second temperature sensor 112, without using a separate material therebetween.

The processor 130 may obtain temperature data by using the plurality of temperature sensors and may estimate body temperature of the object by using the obtained data.

First, the processor 130 may estimate core temperature using a heat flux based on the temperature of the heating element 120, which is measured by the first temperature sensor 111, and the surface temperature of the object which is measured by the second temperature sensor 112.

Figure 3:
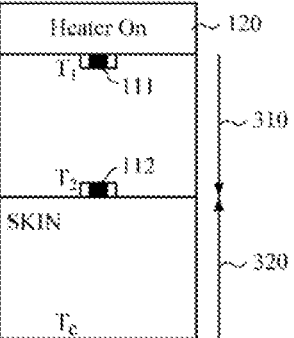
FIG. 3 is a diagram illustrating an example of estimating core temperature of an object using a heat flux based on zero heat flux principle.
Figure 4A:
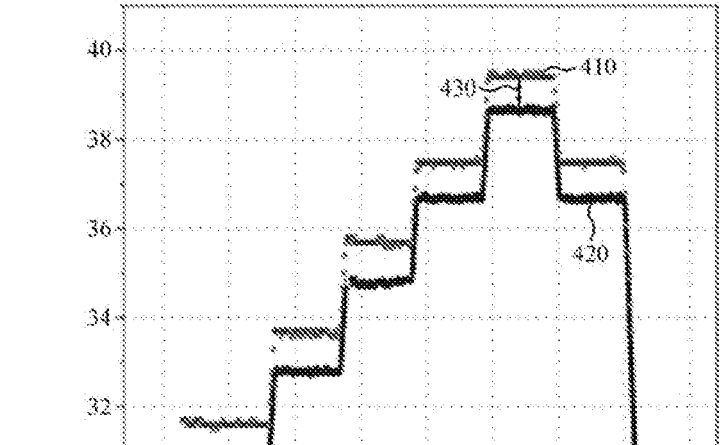
FIGS. 4A to 4E are graphs showing differences between core temperature, estimated using a heat flux according to external temperature, and actually measured body temperature.
Figure 4B:
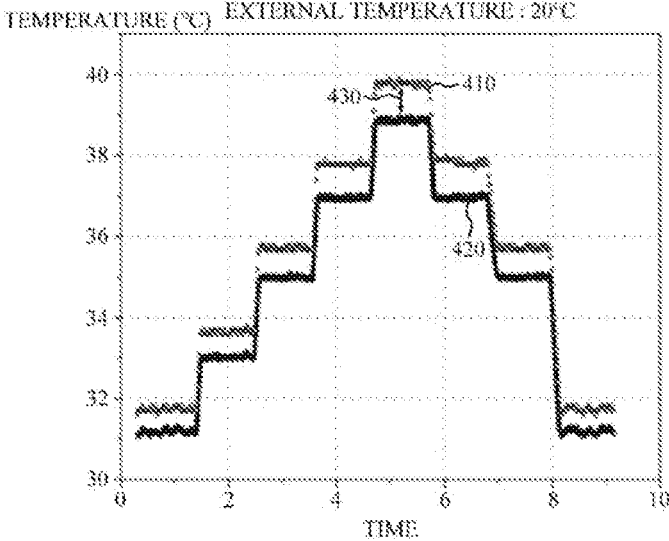
Figure 4C:
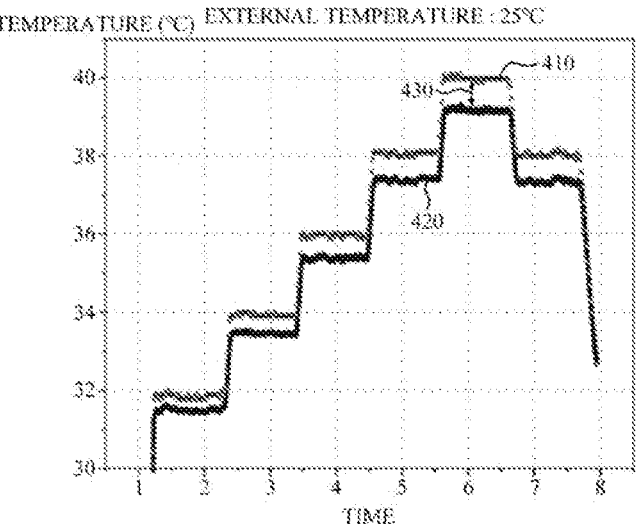
Figure 4D:
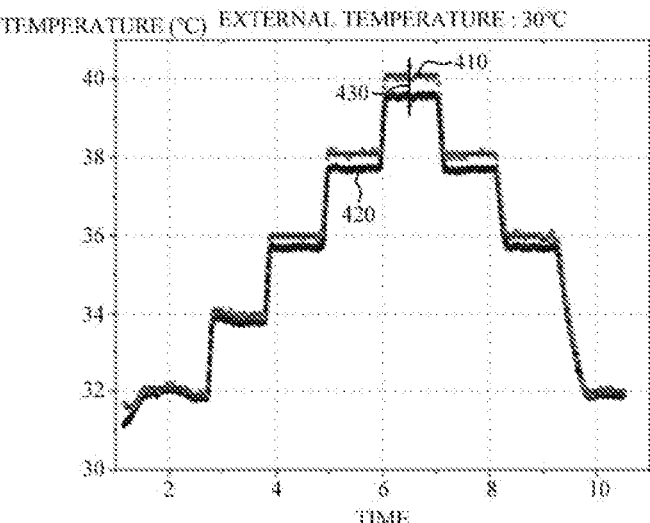
Figure 4E:
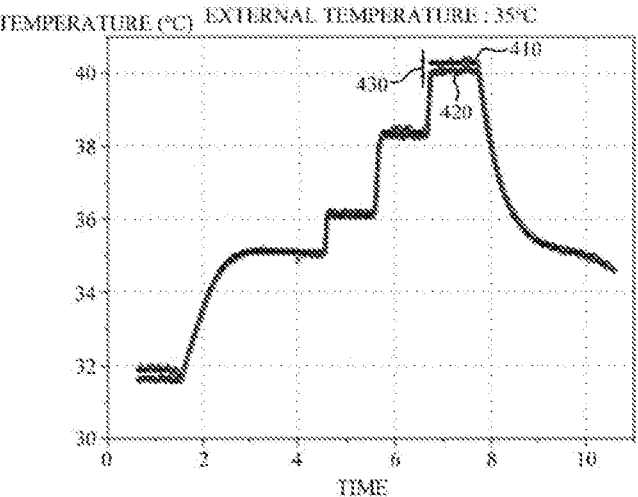

FIG. 3 is a diagram illustrating an example of estimating core temperature of an object using a heat flux based on a zero heat flux principle.

Referring to FIG. 3, a heat flux 320 may be generated from the core to the skin surface by a temperature gradient due to a temperature difference between core temperature $T_c$ and skin surface temperature $T_2$. In this case, in response to a user's request for estimating body temperature, the processor 130 may change temperature by turning on the heating element 120. For example, when the processor 130 increases temperature by turning on the heating element 120 (e.g., heater), a heat flux 310 may be generated from the heating element 120 to the skin surface due to a difference between temperature $T_1$ of the heating element 120 and the skin surface temperature $T_2$. In this case, the skin surface temperature $T_2$ rises due to the heat of the heating element 120, such that the temperature gradient between the core and the skin surface is reduced. That is, the heat flux 320 from the core to the skin surface gradually decreases due to the heat of the heating element 120, and the heat flux 310 from the heating element 120 to the skin surface gradually increases to reach a zero heat flux in which the two heat fluxes 310 and 320 are equal to each other. As a result, the temperature $T_1$ of the heating element, the skin surface temperature $T_2$, and the core temperature $T_c$ resulting from the heat flux are equal to each other in a thermal equilibrium state.

Based on the thermal equilibrium state obtained by the zero heat flux, the processor 130 may turn on the heating element 120, and then may estimate a temperature, at which the surface temperature $T_2$ of the object and the temperature $T_1$ of the heating element are equal to each other, as the core temperature $T_c$ resulting from the heat flux. In this case, in order to prevent a heat loss to accurately estimate the core temperature $T_c$ using the heat flux, the heating element 120, the first temperature sensor 111 for measuring the temperature $T_1$ of the heating element 120, and the second temperature sensor 112 for measuring the skin surface temperature $T_2$ may be arranged in series on the same line.

Then, the processor 130 may estimate the body temperature of the object by correcting the core temperature estimated using the heat flux.

FIGS. 4A to 4E are graphs showing differences between core temperature, estimated using a heat flux according to external temperature, and actually measured body temperature.

Generally, when the core temperature is estimated using the zero-heat flux principle, the estimation is performed using a plurality of temperature sensors and a heating element, without considering external temperature. However, referring to FIGS. 4A to 4E, it can be seen that there is a temperature difference 430, which is an offset, between an actually measured body temperature (e.g., an actual core body temperature) 420 and a core temperature (e.g., a core temperature that is estimated using two temperature sensors, such as the first temperature sensor 111 and the second temperature sensor 112, without using an additional temperature sensor for measuring an external temperature) 410 measured using the heat flux under various external temperature conditions. In this case, as the actually measured body temperature 420 is a value which is not changed by the external temperature, it can be seen that the core temperature 410 measured using the heat flux is affected by the external temperature. Referring to FIGS. 4A-4E, when the external temperature is less than a certain temperature (e.g., 35° C.), or when the external temperature is higher than the actual core body temperature, the measurement accuracy of the core temperature 410 is degraded. Accordingly, in order to measure the body temperature accurately, it is required to correct the effect of the external temperature on the core temperature 140 measured using the heat flux.

For example, the processor 130 may estimate the body temperature of an object by correcting the core temperature, measured using the heat flux, based on the external temperature. In this case, the processor 130 may measure the external temperature by using another temperature sensor disposed in the apparatus 100 for estimating body temperature, or may receive external temperature information from an external source of the apparatus 100 for estimating body temperature. However, the method used by the processor 130 to receive the external temperature is not limited thereto.

Figure 5:
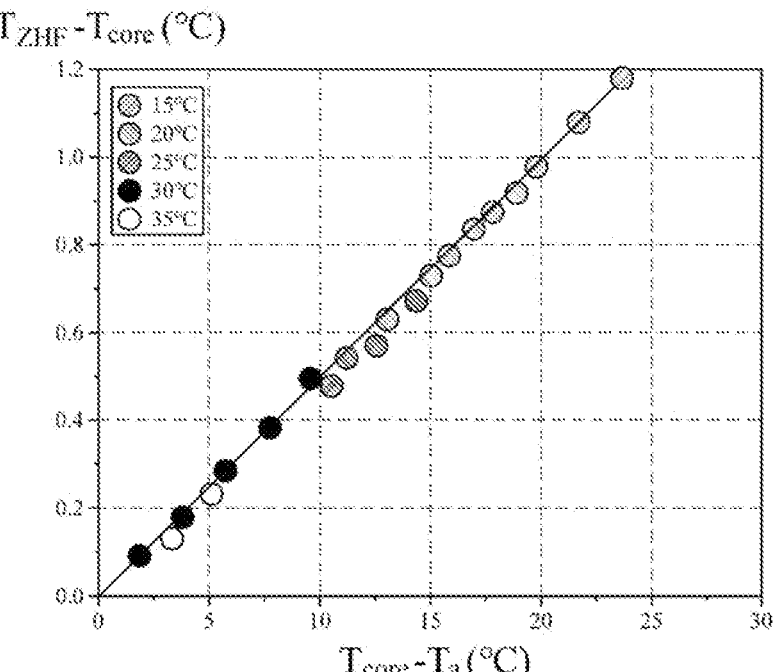
FIG. 5 is a graph showing a correlation of a difference between body temperature and external temperature with a difference between body temperature and core temperature measured using a heat flux.

FIG. 5 is a graph showing a correlation of a difference between body temperature and external temperature with a difference between body temperature and core temperature measured using a heat flux.

Referring to FIG. 5, it can be seen that a temperature difference, which is an offset, between an actual core body temperature $T_C$ and a measured core temperature $T_{ZHF}$ measured using a heat flux under various external temperature conditions (e.g., 15° C., 20° C., 25° C., 30° C., and 35° C.) has a linear correlation with a difference between the actual core body temperature $T_C$ and external temperature $T_a$.

$$T_{ZHF} - T_C = A(T_C - T_a) \qquad \text{[Equation 1]}$$

In this case, A denotes a correction coefficient and may be calculated as a gradient of the graph in FIG. 5. For example, by changing the external temperature at a calibration time, the processor 130 may obtain a gradient based on a difference between the actual core body temperature and the external temperature and a difference between the actual core body temperature and the measured core temperature resulting from the heat flux, and may calculate the correction coefficient based on the obtained gradient. In addition, a predetermined value (e.g., 0.04892), which may be generally used for all users, may be used as the correction coefficient.

Based on the actual core body temperature $T_c$, Equation 1 may be rewritten as Equation 2.

$$T_C = \frac{(T_{ZHF} + A \times T_a)}{(1 + A)} \qquad \text{[Equation 2]}$$

That is, by applying a predetermined correction coefficient A to the external temperature $T_a$, and by combining a result of the application with the core temperature $T_{ZHF}$ resulting from the heat flux, the processor 130 may estimate the actual core body temperature $T_C$ of the object, which is obtained by correction based on the external temperature.

Figure 6:
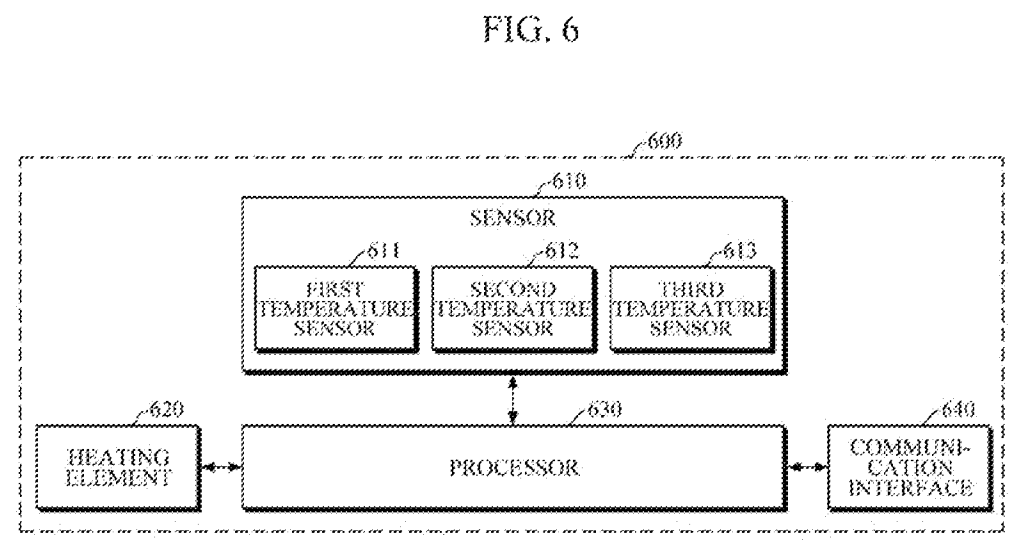

FIG. 6 is a block diagram illustrating an apparatus for estimating body temperature according to another example embodiment of the present disclosure.

Referring to FIG. 6, an apparatus 600 for estimating body temperature includes a sensor 610, a heating element 620, a processor 630, and a communication interface 640, in which the sensor 610 includes a first temperature sensor 611, a second temperature sensor 612, and a third temperature sensor 613. In this case, the first temperature sensor 611, the second temperature sensor 612, the heating element 620, and the processor 630 are substantially the same as those in the embodiment of FIG. 1, such that a detailed description thereof will be omitted.

The third temperature sensor 613 may measure external temperature, and the processor 630 may be electrically connected to the third temperature sensor 613 to receive external temperature measured by the third temperature sensor. In this case, the third temperature sensor 613 may be disposed inside or outside of the apparatus 600 for estimating body temperature.

Figure 7A:
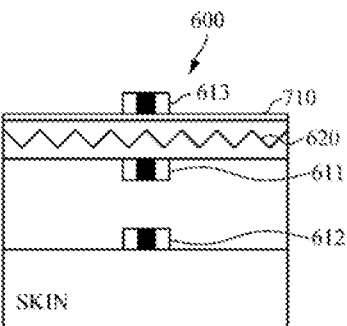
FIGS. 7A and 7B are diagrams illustrating examples of arrangement of a third temperature sensor.
Figure 7B:
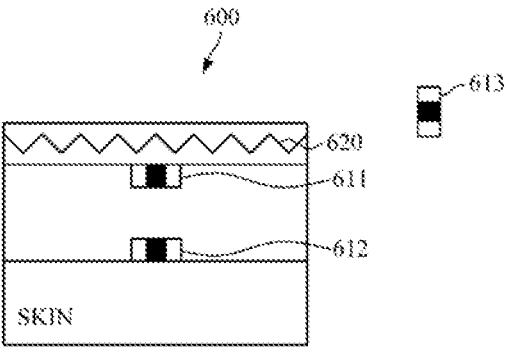

FIGS. 7A and 7B are diagrams illustrating examples of arrangement of a third temperature sensor.

Referring to FIG. 7A, the third temperature sensor 613 may be integrally mounted with the first temperature 611, the second temperature sensor 612, and the heating element 620 in the apparatus 600 for estimating body temperature, and may be disposed at a position farthest from a contact surface of the object in order to measure external temperature. In this case, an insulating layer 710 may be disposed between the heating element 620 and the third temperature sensor 613 so as to minimize the effect of heat from the heating element 620. In addition, referring to FIG. 7B, the third temperature sensor 613 may be separated from the first temperature sensor 611, the second temperature sensor 612, and the heating element 620 inside or outside of the apparatus 600 for estimating body temperature. However, the arrangement of the third temperature sensor 613 is not limited thereto.

The communication interface 640 may communicate with an external device to transmit and receive various data related to estimating body temperature. In this case, the external device may include an information processing device such as a smartphone, a tablet PC, a desktop computer, a laptop computer, and the like. For example, the communication interface 640 may receive external temperature from an external temperature measuring device which is included in the external device or which may directly measure external temperature, and may transmit the received external temperature to the processor 630. In addition, the communication interface 640 may transmit a body temperature estimation result to the external device, such as a user's smartphone and the like, so that the user may manage and monitor the estimation result by using a device having a relatively high performance.

In this case, the communication interface 640 may communicate with the external device by using various wired or wireless communication techniques, such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, this is merely exemplary and is not intended to be limiting.

Figure 8:
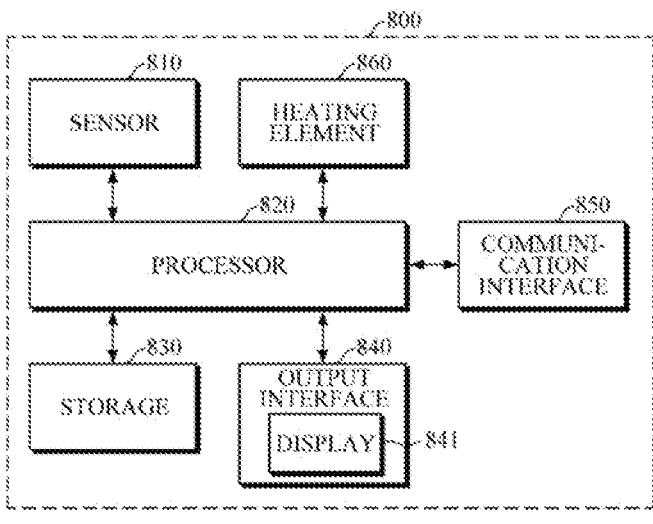
FIG. 8 is a block diagram illustrating an apparatus for estimating body temperature according to yet another example embodiment of the present disclosure.

FIG. 8 is a block diagram illustrating an apparatus for estimating body temperature according to yet another example embodiment of the present disclosure.

Referring to FIG. 8, an apparatus 800 for estimating body temperature includes a sensor 810, a processor 820, a storage 830, an output interface 840, a communication interface 850, and a heating element 860. The output interface 840 may include a display 841. In this case, the sensor 810, the processor 820, the heating element 860, and the communication interface 850 are the same as those in the embodiments of FIGS. 1 and 6, such that a detailed description thereof will be omitted.

The storage 830 may store information related to estimating body temperature. For example, the storage 830 may store the surface temperature of an object, the temperature of a heater, and processing results of the processor 820, e.g., core body temperature resulting from a heat flux, external temperature, correction coefficient, and the like.

The storage 830 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 840 may provide the processing results of the processor 820 for a user. For example, the output interface 840 may display an estimated body temperature value of the processor 820 on the display device 841. In this case, if the estimated body temperature value falls outside a normal range, the output interface 840 may provide the user with warning information by changing color, line thickness, etc., or displaying the abnormal value along with the normal range, so that the user may easily recognize the abnormal value. In addition, the output interface 840 may output an interface to the display 841, and may receive external temperature from the user through the interface and may transmit the external temperature to the processor 820.

Further, along with or without the visual output displayed on the display 841, the output interface 840 may provide the estimated body temperature value for the user in a non-visual manner by voice, vibrations, tactile sensation, and the like using an audio output module such as a speaker, or a haptic module and the like.

The display 841 may include touch circuitry adapted to detect a touch, and/or sensor circuitry (e.g., pressure sensor, etc.) adapted to measure the intensity of force incurred by the touch.

Figure 9:
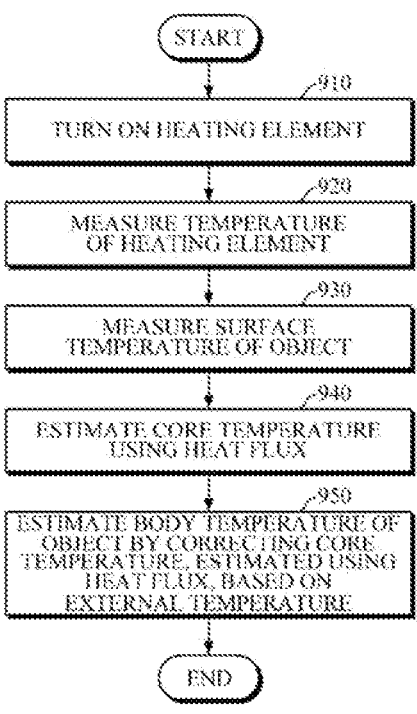
FIG. 9 is a flowchart illustrating a method of estimating body temperature according to a example embodiment of the present disclosure.

FIG. 9 is a flowchart illustrating a method of estimating body temperature according to an example embodiment of the present disclosure.

The method of FIG. 9 is an example of a method of estimating body temperature performed by the apparatuses 100, 600, and 800 for estimating body temperature according to the embodiments of FIGS. 1, 6, and 8, which are described in detail above, and thus will be briefly described below in order to avoid redundancy.

Referring to FIG. 9, in response to a user's request for estimating body temperature, the apparatus for estimating body temperature may first change temperature by turning on the heating element in operation 910. The heating element is a structure for radiating heat in the apparatus for estimating body temperature, and a heater may be used as an example of the heating element. In addition, a heating structure (battery) included in the apparatus for estimating body temperature may be used instead of the heater, and an LED capable of converting light to heat may also be used separately.

Then, the apparatus for estimating body temperature may measure temperature of the heating element by using the first temperature sensor disposed at a lower end of the heating element in operation 920, and upon contact with an object, may measure surface temperature of the object by using the second temperature sensor disposed at a position spaced apart from the first temperature sensor in operation 930. In this case, the first temperature sensor and the second temperature sensor may include a thermistor.

Subsequently, the apparatus for estimating body temperature may estimate core temperature using a heat flux based on the temperature of the heating element and the surface temperature of the object in operation 940. For example, the apparatus for estimating body temperature may estimate a temperature, at which the surface temperature of the object and the temperature of the heating element are equal to each other, as the core temperature resulting from the heat flux.

Next, the apparatus for estimating body temperature may estimate body temperature of the object by correcting the core temperature, estimated using the heat flux, based on external temperature in operation 950. For example, by applying a predetermined correction coefficient to the external temperature, and by combining a result of the application with the core temperature resulting from the heat flux, the processor 130 may estimate the body temperature of the object based on a result of the combination. In this case, by changing the external temperature at a calibration time, the apparatus for estimating body temperature may obtain a gradient based on a difference between the body temperature and the external temperature and a difference between the body temperature and the core temperature resulting from the heat flux, and may calculate the correction coefficient based on the obtained gradient. In addition, the apparatus for estimating body temperature may measure the external temperature by using the third temperature sensor, or may receive the external temperature from an external device or an external temperature measuring device included in the external device.

FIGS. 10 to 13 are diagrams illustrating examples of structures of an electronic device including an apparatus for estimating air temperature. Examples of the electronic device may include not only a smart watch, but also a smartphone, a smart band, a smart patch, smart glasses, a smart necklace, and an ear-wearable device, but the electronic device is not limited thereto.

Figure 10:
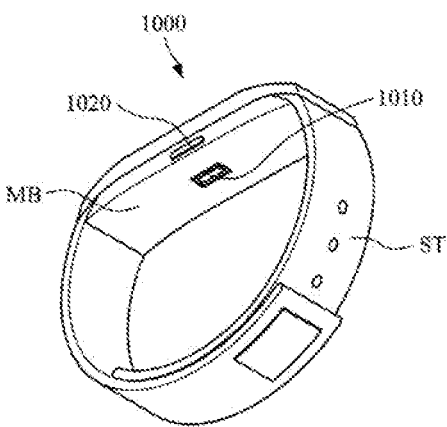
FIGS. 10 to 13 are diagrams illustrating examples of structures of an electronic device including an apparatus for estimating air temperature.

Referring to FIG. 10, the electronic device may be implemented as a smart watch-type wearable device 1000 which includes a main body MB and a wrist strap ST.

The main body MB may be formed in various shapes. A battery may be embedded in the main body MB and/or the strap ST to supply power to various components of the wearable device. The strap ST may be connected to both ends of the main body to allow the main body to be worn on a user's wrist, and may be flexible so as to be wrapped around the user's wrist. The strap ST may be composed of a first strap and a second strap which are separated from each other. One ends of the first strap and the second strap are connected to both sides of the main body MB, and the other ends thereof may be connected to each other via a fastening means. In this case, the connecting means may be formed as magnetic fastening, Velcro fastening, pin fastening, and the like, but is not limited thereto. Further, the strap ST is not limited thereto, and may be integrally formed as a non-detachable band.

The main body MB may include a heating element, a sensor 1010, a processor, an output interface, a storage, and a communication interface. However, depending on the size and shape of a form factor and the like, some of the storage and the communication interface may be omitted.

A manipulator 1020 may be formed on a side surface of the main body MB, as illustrated herein. The manipulator 1020 may receive a user's command and may transmit the received command to the processor. In addition, the manipulator 1020 may have a power button to turn on/off the wearable device 1000.

The sensor 1010 may include a plurality of temperature sensors disposed at different positions. For example, a first temperature sensor may measure temperature of a heating element. In this case, the first temperature sensor and the heating element may be disposed on the same plane. For example, the heating element and the first temperature sensor may be disposed in parallel with each other, and the heating element may surround the first temperature sensor. A second temperature sensor may be disposed at a position spaced apart from the first temperature sensor, and may measure surface temperature of an object upon contact with the object. In addition, at least one of the plurality of temperature sensors may be a thermistor.

The processor mounted in the main body MB may be electrically connected to various components including the sensor 1010 and the heating element. For example, the processor may estimate body temperature of the object by estimating core temperature using a heat flux based on the temperature of the heating element and the surface temperature of the object, and by correcting the core temperature, estimated using the heat flux, based on external temperature. In this case, the processor may estimate a temperature, at which the surface temperature of the object and the temperature of the heating element are equal to each other, as the core temperature resulting from the heat flux. Then, by applying a predetermined correction coefficient to the external temperature, and by combining a result of the application with the core temperature resulting from the heat flux, the processor may estimate the body temperature of the object based on a result of the combination. In this case, the wearable device 1000 may further include a display to receive external temperature from a user through an interface on the display. In addition, the wearable device 1000 may further include a third temperature sensor disposed inside or outside of the device and measuring external temperature, and may receive external temperature, measured by the third temperature sensor, from the third temperature sensor.

Figure 11:
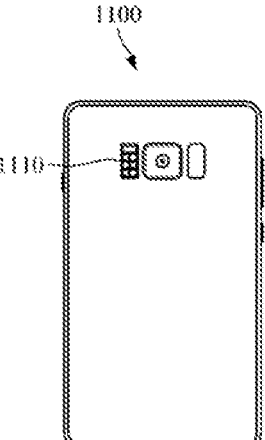

Referring to FIG. 11, the electronic device may be implemented as a mobile device 1100 such as a smartphone.

The mobile device 1100 may include a housing and a display panel. The housing may form an outer appearance of the mobile device 1100. The housing has a first surface, on which a display panel and a cover glass may be disposed sequentially, and the display panel may be exposed to the outside through the cover glass. A sensor 1110, a camera module and/or an infrared sensor, and the like may be disposed on a second surface of the housing.

For example, a plurality of temperature sensors for obtaining data from a user may be disposed on a rear surface of the mobile device 1100, and a fingerprint sensor disposed on the front surface of the mobile device 1100, a power button or a volume button disposed on a side surface thereof, sensors disposed on other positions of the front and rear surfaces of the mobile device 1100, and the like may be provided to estimate a user's body temperature.

In addition, when a user transmits a request for estimating body temperature by executing an application and the like installed in the mobile device 1100, the mobile device 1100 may obtain data by using the sensor 1110, and may estimate the body temperature and may provide the estimated value to the user as an image and/or sound by using the processor in the mobile device 1100.

Figure 12:
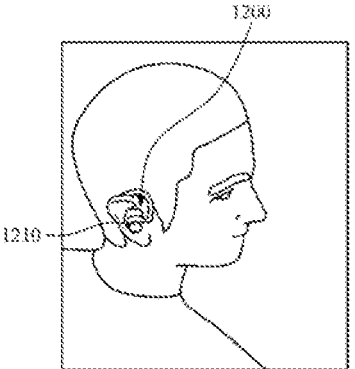

Referring to FIG. 12, the electronic device may be implemented as an ear-wearable device 1200.

The ear-wearable device 1200 may include a main body and an ear strap. A user may wear the ear-wearable device 1200 by hanging the ear strap on the user's auricle. The ear strap may be omitted depending on the shape of ear-wearable device 1200. The main body may be inserted into the external auditory meatus. A sensor 1210 may be mounted in the main body. The ear-wearable device 1200 may provide a user with a body temperature estimation result and/or body temperature guidance information as sound, or may transmit the information to an external device, e.g., a mobile device, a tablet PC, a personal computer, etc., through a communication module provided in the main body.

Figure 13:
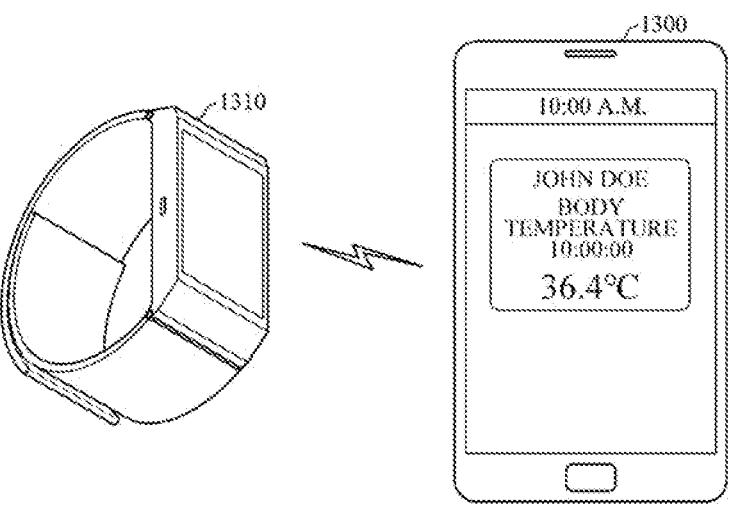

Referring to FIG. 13, the electronic device may be implemented as a combination of a wristwatch-type wearable device and a smartphone. For example, a processor for estimating body temperature may be mounted in a main body of the mobile device 1300. Upon receiving a request for measuring body temperature, the processor of the mobile device 1300 may control a communication interface to communicate with a communication module mounted in the main body of the wearable device 1310, to obtain data. Further, upon receiving data, such as surface temperature of an object, temperature of a heating element, etc., from the wearable device 1310, the processor may estimate body temperature and may output an estimation result on a display of the mobile device 1300 through an output interface, as illustrated herein. In this case, in response to the user's request, the processor may display and provide not only a current estimated body temperature value, but also continuous estimated body temperature values over time on the display for the user. In addition, the processor may display a body temperature variation, for example, a body temperature change during a day, in a graph on the display and may also display information on sleep quality according to the body temperature change on the display.

The present invention can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily deduced by programmers of ordinary skill in the art to which the invention pertains.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for estimating a body temperature, the apparatus comprising:

a heating element;

a first temperature sensor configured to measure a temperature of the heating element;

a second temperature sensor configured to measure a surface temperature of an object at a surface of the object when the second temperature sensor is in contact with the object;

a third temperature sensor configured to measure an external temperature external to the apparatus; and a processor configured to:

control the heating element to generate a heat flux from the heating element to the surface of the object by a difference between the temperature of the heating element and the surface temperature of the object;

estimate a core temperature of the object based on the heat flux reaching zero; and estimate the body temperature of the object by multiplying a predetermined correction coefficient to the external temperature to obtain a corrected external temperature, and adding the corrected external temperature with the estimated core temperature, wherein the estimated body temperature satisfies:

$$Tc = (Tzhf + A \times Ta)/(1 + A),$$

where Tc is the estimated body temperature, Tzhf is the estimated core temperature, A is the predetermined correction coefficient, and Ta is the external temperature, and wherein the first temperature sensor is disposed between the heating element and the second temperature sensor, the first temperature sensor being on a bottom surface of the heating element.

2. The apparatus of claim 1, wherein in response to a user's request for estimating the body temperature, the processor is further configured to change the temperature of the heating element by turning on the heating element.

3. The apparatus of claim 2, wherein the processor is further configured to estimate the core temperature in a state in which the surface temperature of the object becomes equal to the temperature of the heating element.

4. The apparatus of claim 1, further comprising a communication interface configured to receive the external temperature from an external temperature measuring device.

5. The apparatus of claim 1, further comprising a display configured to display a user interface to receive the external temperature from a user.

6. The apparatus of claim 1, wherein the first temperature sensor, the second temperature sensor, and the heating element are arranged in a single line.

7. The apparatus of claim 1, wherein the heating element comprises at least one of a heater, a battery included in the apparatus, and a light emitting diode (LED).

8. The apparatus of claim 1, wherein the apparatus is a smart watch, and further comprises a main body, and a strap connected to the main body, and wherein the second temperature sensor is disposed on a rear surface of the main body to be contacted by a wrist when the second temperature sensor is turned on to measure a skin temperature of the wrist as the surface temperature of the object.

9. The apparatus of claim 8, wherein the first temperature sensor and the second temperature sensor is disposed in a thickness direction of the main body.

10. A method of estimating body temperature by an apparatus, the method comprising:

measuring a temperature of a heating element by using a first temperature sensor;

measuring a surface temperature of an object at a surface of the object by using a second temperature sensor when the second temperature sensor is in contact with the object;

measuring an external temperature by using a third temperature sensor external to the apparatus;

controlling the heating element to generate a heat flux from the heating element to the surface of the object by a difference between the temperature of the heating element and the surface temperature of the object;

estimating a core temperature of the object based on the heat flux reaching zero; and estimating a body temperature of the object by multiplying a predetermined correction coefficient to the external temperature to obtain a corrected external temperature, and adding the corrected external temperature with the estimated core temperature, wherein the estimated body temperature satisfies:

$$Tc = (Tzhf + A \times Ta)/(1 + A),$$

where Tc is the estimated body temperature, Tzhf is the estimated core temperature, A is the predetermined correction coefficient, and Ta is the external temperature, and wherein the first temperature sensor is disposed between the heating element and the second temperature sensor, the first temperature sensor being on a bottom surface of the heating element.

11. The method of claim 10, further comprising, in response to a user's request for estimating the body temperature, changing the temperature of the heating element by turning on the heating element.

12. The method of claim 10, wherein the estimating of the core temperature using the heat flux comprises estimating the core temperature in a state in which the surface temperature of the object becomes equal to the temperature of the heating element.

13. A non-transitory computer readable storage medium storing instructions, when executed by at least one processor, to perform a method for estimating body temperature, the method comprising:

measuring a temperature of a heating element by using a first temperature sensor;

measuring a surface temperature of an object at a surface of the object by using a second temperature sensor when the second temperature sensor is in contact with the object;

measuring an external temperature by using a third temperature sensor external to the heating element;

controlling the heating element to generate a heat flux from the heating element to the surface of the object by a difference between the temperature of the heating element and the surface temperature of the object;

estimating a core temperature of the object based on the heat flux reaching zero; and estimating a body temperature of the object by multiplying a predetermined correction coefficient to the external temperature to obtain a corrected external temperature, and adding the corrected external temperature with the estimated core temperature, wherein the estimated body temperature satisfies:

$$Tc = (Tzhf + A \times Ta)/(1 + A),$$

where Tc is the estimated body temperature, Tzhf is the estimated core temperature, A is the predetermined correction coefficient, and Ta is the external temperature, and wherein the first temperature sensor is disposed between the heating element and the second temperature sensor, the first temperature sensor being on a bottom surface of the heating element.

14. The non-transitory computer readable storage medium of claim 13, wherein further comprising, in response to a user's request for estimating the body temperature, changing the temperature of the heating element by turning on the heating element.

15. The non-transitory computer readable storage medium of claim 13, wherein the estimating of the core temperature using the heat flux comprises estimating the core temperature in a state in which the surface temperature of the object becomes equal to the temperature of the heating element.

\* \* \* \* \*